(12) United States Patent
Ehrman et al.

(10) Patent No.: US 7,694,665 B2
(45) Date of Patent: Apr. 13, 2010

(54) LIQUID VAPOR SEPARATOR

(75) Inventors: Moshe Ehrman, D.N. Halutza (IL);
Omer Vulkan, D.N. Halutza (IL);
Vladimir Olshanetsky, Beer Sheva (IL);
Karl-Peter Grun, St. Augustin (DE);
Ibrahim Koukan, Cologne (DE)

(73) Assignee: Raval A.C.S. Ltd., D.N. Halutza (IL)

( * ) Notice: Subject to any disclaimer, the term of this patent is extended or adjusted under 35 U.S.C. 154(b) by 0 days.

(21) Appl. No.: 12/068,170

(22) Filed: Feb. 4, 2008

(65) Prior Publication Data

US 2008/0184972 A1    Aug. 7, 2008

Related U.S. Application Data

(60) Provisional application No. 60/899,406, filed on Feb. 5, 2007.

(51) Int. Cl.
*F02M 33/02* (2006.01)
*F02M 33/04* (2006.01)

(52) U.S. Cl. .................................................. 123/518

(58) Field of Classification Search ................ 123/518, 123/519, 516, 198 D; 137/587, 588, 589, 137/43
See application file for complete search history.

(56) References Cited

U.S. PATENT DOCUMENTS

| | | | | |
|---|---|---|---|---|
| 4,658,796 A | * | 4/1987 | Yoshida et al. | 123/519 |
| 4,770,677 A | | 9/1988 | Harris | |
| 5,606,954 A | * | 3/1997 | Yamazaki et al. | 123/520 |
| 5,740,842 A | * | 4/1998 | Maier et al. | 141/45 |
| 5,840,104 A | * | 11/1998 | Hashimoto et al. | 96/135 |
| 6,000,426 A | * | 12/1999 | Tuckey et al. | 137/588 |
| 6,318,398 B1 | | 11/2001 | Ehrman et al. | |
| 6,405,747 B1 | | 6/2002 | King et al. | |
| 6,523,527 B1 | * | 2/2003 | Ozaki et al. | 123/519 |
| 2002/0153374 A1 | | 10/2002 | Isobe | |

FOREIGN PATENT DOCUMENTS

RU    2 203 190 C2    4/2003

* cited by examiner

*Primary Examiner*—Mahmoud Gimie
(74) *Attorney, Agent, or Firm*—The Nath Law Group; Derek Richmond; Sung Yeop Chung

(57) ABSTRACT

A liquid vapor separator for a vehicle's fuel system, said liquid vapor separator comprising a body having an inlet connectable with a venting system of a fuel tank and a vapor outlet connectable to a fuel vapor treating device, and a condensation space for condensation of fuel droplets, said space being in flow communication with said inlet and with said outlet, and said condensation space extending at or being in flow communication with a filler neck of the fuel system.

31 Claims, 16 Drawing Sheets

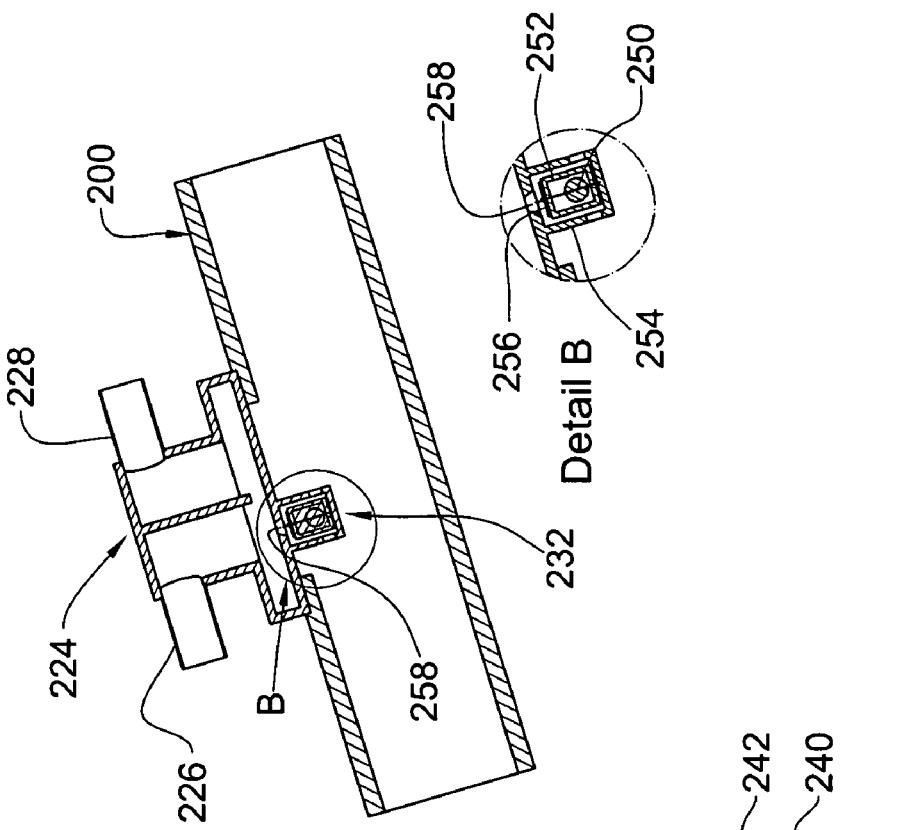
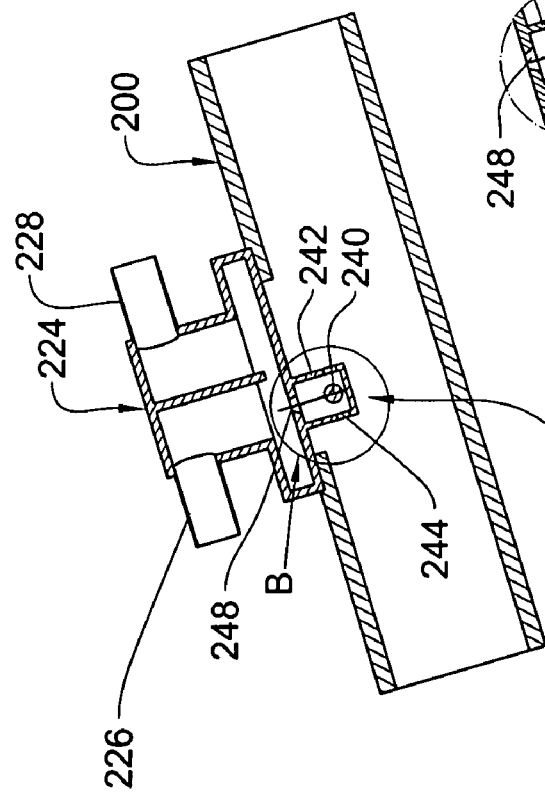
FIG. 12B
FIG. 12A

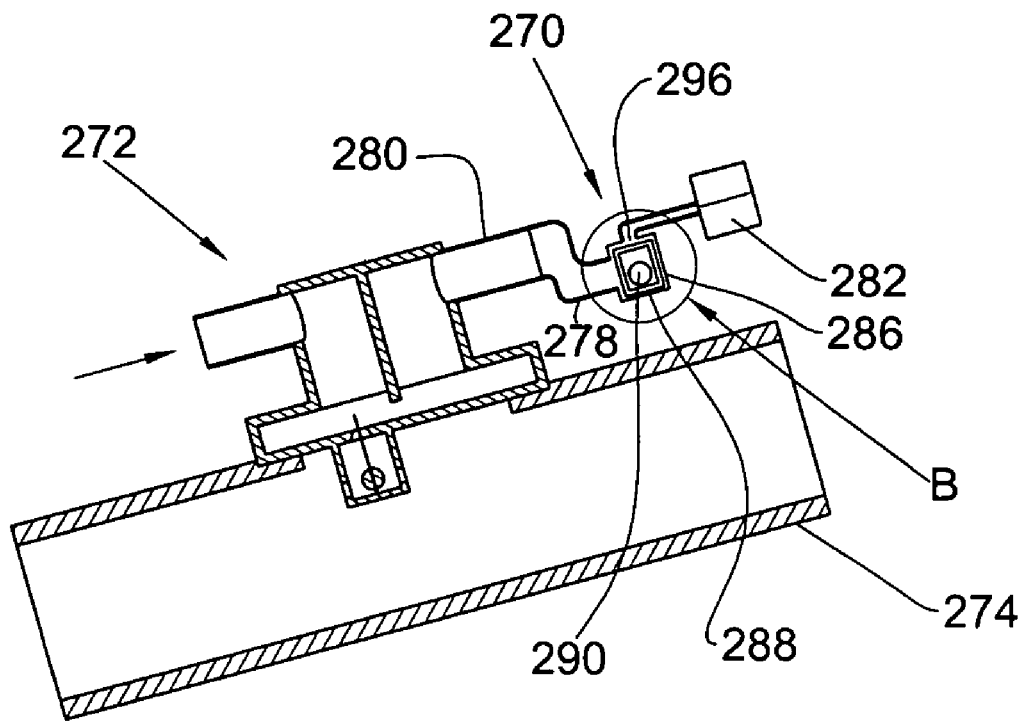
FIG. 12C
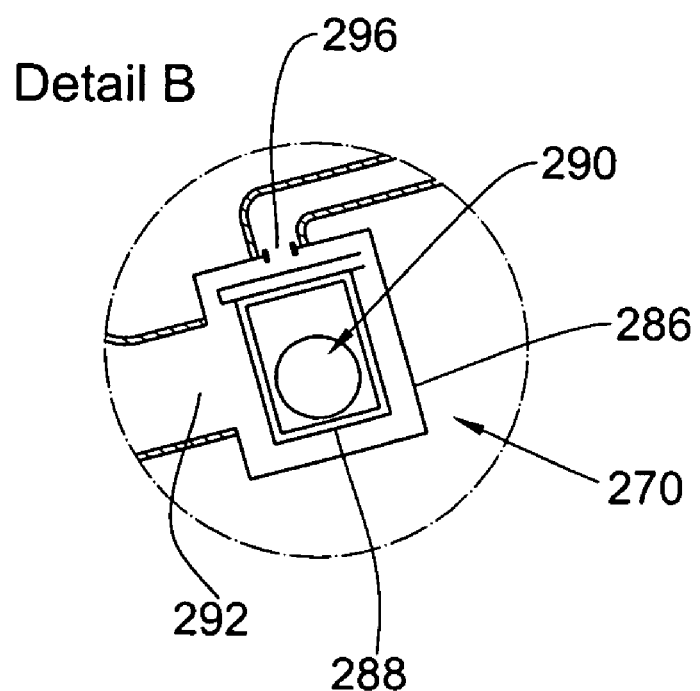
Detail B

LIQUID VAPOR SEPARATOR

This is a Non-Provisional Application of U.S. Provisional Patent Application No. 60/899,406, filed on Feb. 5, 2007, the entire content of which is hereby incorporated by reference in its entirety.

FIELD OF THE INVENTION

This invention relates to fuel systems for vehicles and more particularly to a liquid vapor separator (LVS) of the type fitted on a filler-head (also referred to as a filler-neck or a refueling passage) of a filler pipe fitted in a vehicle's fuel system.

BACKGROUND OF THE INVENTION

It is known in the field of vehicles and fuel systems, to use a filter canister (fuel vapor filter typically a fuel vapor filter) for fuel vapor exiting the fuel tank. The fuel vapor carried from the fuel system often contains an amount of fuel droplets which may have a damaging effect on the operation of the fuel vapor filter.

A wide variety of solutions has been offered to prevent the introduction of fuel droplets into the fuel vapor filter along with the fuel vapor.

One such solution is using a liquid vapor separator, for example as disclosed in U.S. Pat. No. 6,405,747 directed to an apparatus for controlling discharge of fuel vapor from within a vehicle fuel tank, which apparatus includes at least a primary and auxiliary liquid separating chamber positioned above a float chamber below a valve outlet. The apparatus includes at least one baffle arranged to intercept and direct filtered fuel droplets from the vapor flow and return the liquid fuel to the fuel tank. The primary and auxiliary liquid separation chambers and associated baffle are positioned to facilitate flow of fuel vapor from the tank yet return liquid fuel to the tank Another solution for dealing with the above problem, is in the form of expansion tanks, for example as discussed in U.S. Pat. No. 6,318,398 to the applicant of the present application, which discloses a fuel expansion device for a vehicle fuel tank, the device comprising a housing formed of a first housing member and a second housing member, both made of an essentially impermeable material and being sealingly and impermeably attached to one another. At least one inlet port for fuel fluid ingress is formed in the first member and is in flow communication with the fuel tank, and an outlet port is formed in the second member connectable to a fuel fluid handling device.

SUMMARY OF THE INVENTION

According to the present invention there is provided a liquid vapor separator (LVS) for a fuel system of an automobile, comprising a filler neck connected to a fuel tank, and a vapor line providing fluid flow communication between said fuel tank and a fuel vapor filter; said liquid vapor separator comprising a body having an inlet in fluid communication with an outlet of said fuel tank via a first portion of said vapor line, an outlet in fluid communication with said fuel vapor filter via a second portion of said vapor line, and a draining port providing fluid communication between said body and said filler head, wherein said body is adapted to receive fuel vapor and droplets from said fuel tank through said inlet, and being so constructed as to channel the vapor to said fuel vapor filter through said outlet while diverting the droplets to said filler head through said draining port, whereby said fuel droplets are prevented from reaching said fuel vapor filter and are redirected back into said fuel tank.

The arrangement of the present invention is such that the inlet of the liquid vapor separator is exposed to pressure residing within the fuel tank and a liquid separator is exposed to pressure residing at the filler neck, whereby pressure differential between over the liquid vapor separator results in separation of the liquid fuel droplets from the fuel vapor such that liquid fuel can return by force of gravity towards the fuel tank whilst fuel vapor is treated separately.

Treating of the fuel vapor is carried out by a central solution (e.g. by the gas station as vapor is withdrawn through the refueling muzzle), or by the vehicle's fuel vapor treating device (canister).

According to one embodiment, the liquid vapor separator is so positioned that said inlet is located below the outlet, and above said draining port, whereby fuel vapor should flow upwards in order to reach the fuel vapor filter through said outlet, while droplets may drop down and reach the filler neck through the draining port.

The liquid vapor separator acts such that some of the fuel vapor entering thereto may condense into droplets. The liquid vapor separator may further be adapted to drain said droplets back to the draining port and from there to said filler neck. The body may thus be formed as a hollow housing with at least one separating wall therein adapted to provide a labyrinth flow path (a maze flow path) and an additional condensation surface for said fuel vapor. Said at least one separating wall may be in a variety of forms, resulting in flow maneuvers of the fuel vapor to prevent droplets to escape through the first outlet and provide large enough surface area to allow vapor to be trapped thereon, and flow into said draining port. For example, it may have a convex surface from which said droplets may drip down or a maze comprising several interlacing walls wherein fuel flow is forced between said walls such that droplets are arrested by the maze walls and then drip towards the draining port.

Fuel drainage is of such a configuration that the condensed or entrained fuel runs off into the filler neck substantially under the effect of the force of gravity.

The liquid vapor separator may further be fitted with a roll over valve (ROV) adapted to prevent leakage in case of roll over of the automobile ('side-up' and 'bottom-up' and 'front-up' positions above approximately 60°) as known per se. On the other hand, when the automobile is in its normal position, the ROV may be adapted to pass any fuel droplets entering therein into the filler neck.

In operation, fuel vapor is pumped by venting valves from the fuel tank into the fuel vapor filter through the first portion of the vapor line. Said vapor is in fact a mixture of vapor and droplets, i.e. mixed vapor. When the mixed vapor reaches the liquid vapor separator, it enters into the hollow body through said inlet, located at the bottom of said body. The fuel vapors may then flow up freely to the outlet to reach the fuel vapor filter. The fuel droplets on the other hand, due to both their weight and the one or more separating wall within said hollow body, drop down or drip along said one or more separating wall, accumulate in bottom of the liquid vapor separator and drain into the draining port and from there back to the filler neck while the pressure in the filler neck is below or equal the pressure in the liquid vapor separator.

Furthermore, due to slight increase in volume when passing from said vapor line to said hollow body, some of the fuel vapor may condense on the inner walls and separating wall of the hollow body, and drip down to said outlet as well.

The arrangement is such that when a fuel vapor mixture, containing also fuel droplets, enters a large space within the valve, the pressure will drop resulting in separation of the fuel droplets from the fuel vapor, owing to substantial decrease in flow speed.

In addition, during filling of the fuel tank (refueling), when a nozzle of a fuel gun is inserted into the filler neck, said draining port is positioned above the tip of the nozzle, whereby flooding of the hollow body through said draining port is prevented.

Furthermore, the filler neck may be fitted with a flapper door, whereby inserting the fuel refueling nozzle may partially block the draining port preventing liquid fuel entering through this opening into the liquid vapor separator.

The system according to the present invention is provided, in a flow path extending between the tank refueling venting conduit and the fuel vapor filter, with a connection to the tank refueling passage (filler neck), which serves as a recirculation flow path. This arrangement ensures that part of the fuel vapor flowing out of the fuel tank, during refueling, is re-circulated through the tank filler neck to thereby reduce liquid fuel flow to the fuel vapor filter. The recirculation flow path during refueling can be restricted if necessary by the flapper door of the filler neck.

The draining port may also be used for an on board diagnostic system (OBD), overcoming the need for creation of an outlet dedicated therefore.

According to one aspect of the invention there is a liquid vapor separator for a vehicle's fuel system, said liquid vapor separator comprising a body having a fuel vapor inlet extending into an inlet space, a fuel vapor outlet extending from an outlet space, and a droplet separator comprising at least one partition wall for separating fuel droplets from the fuel vapor and directing said droplets to a draining port connectable to the vehicle's fuel tank.

Any one or more of the following designs and features may take place in a liquid vapor separator according to the invention:

the droplet separator is a maze comprising at least two interlacing walls such that fuel flow is forced between said walls, wherein fuel droplets are captured by the maze walls and drip towards the draining port.

the droplet separator is a labyrinth flow path comprising a condensation surface for said fuel vapor.

The fuel vapor inlet is adapted for coupling to an outlet of a venting system of the fuel system, and the fuel vapor outlet is adapted for coupling to a fuel vapor filter of the fuel system.

a fuel vapor flow path extends between the fuel vapor inlet and the fuel vapor outlet, said flow path passing through the inlet space and the outlet space, and wherein the partition wall extends between said inlet space and said outlet space serving as a gas expansion space.

the fuel vapor inlet is located below the fuel vapor outlet and above the draining port, whereby fuel vapor is directed to flow upwards to egress through said outlet, while fuel droplets within fuel vapor drop down towards the draining port.

the draining port extends into a fuel filler neck of the fuel system.

the fuel vapor inlet extends into a fuel filler neck of the fuel system serving as an expansion space, and wherein the fuel vapor outlet is in flow communication with the fuel filler neck.

A wall of the liquid vapor separator attached to the fuel filler neck is formed with at least one inlet aperture formed at an upper portion thereof, and with at least one outlet aperture formed at an bottom portion thereof, said at least one inlet aperture being in flow communication with the fuel vapor outlet and said at least one outlet aperture being in flow communication with the fuel vapor inlet; said at least one inlet aperture and at least one outlet aperture extending to the filler neck of the fuel system.

the fuel vapor inlet is in flow communication with the fuel vapor outlet via an expansion space of the housing, said space comprising the draining port extending into a fuel filler neck of the fuel system.

Another aspect of the invention is directed to a vehicle's fuel system comprising a fuel vapor filter, a fuel tank fitted with a filler neck having a filler head, and a liquid vapor separator, said liquid vapor separator comprising a body having a fuel vapor inlet extending into an inlet space, a fuel vapor outlet extending from an outlet space, and a droplet separator comprising at least one partition wall for separating fuel droplets from the fuel vapor and directing said droplets to a draining port connectable to the vehicle's fuel tank via said filler head.

Any one or more of the following designs and features may take place in a vehicle's fuel system according to the invention:

the fuel vapor inlet is located below the fuel vapor outlet and above the draining port, whereby fuel vapor is directed to flow upwards to egress through said outlet, while droplets within fuel vapor drop down towards the draining port, whereby the liquid vapor separator may further be adapted to drain said droplets back to the draining port and from there to the filler head.

the droplet separator is a maze comprising at least two interlacing walls such that fuel flow is forced between said walls, wherein fuel droplets are captured by the maze walls and drip towards the draining port.

fuel drainage is of such a configuration that condensed or entrained fuel runs off into the filler neck substantially under the effect of the force of gravity.

the droplet separator is a maze comprising at least two interlacing walls such that fuel flow is forced between said walls, wherein fuel droplets are arrested by the maze walls and drip towards the draining port.

the fuel vapor outlet is coupled to a fuel vapor filter.

an on board diagnostic system is coupled to the fuel vapor outlet.

the filler head is fitted with a flapper door displaceable between a normally closed position and an open position, wherein at said open position said flapper door partially interferes with the draining port to thereby reduce its effective area.

the draining port is positioned at a level above a tip of a fuel gun nozzle inserted into the filler head whereby flooding of the liquid vapor separator through said draining port is prevented.

the maze comprises several interlacing walls wherein fuel flow is forced between said walls such that droplets are arrested by the maze walls and then drip towards the draining port.

the inlet of the liquid vapor separator is located below the outlet and above the draining port, whereby fuel vapor should flow upwards in order to reach the said outlet, while droplets within fuel vapor drop down towards the draining port, wherein fuel vapors flow up to the outlet to reach the fuel vapor filter and fuel droplets drop down or drip along said one or more separating wall, accumulate in bottom of the liquid vapor separator and drain into the draining port and from there back to the filler head while the pressure in the filler neck is below or equal the pressure in the liquid vapor separator.

wherein the inlet space and the outlet space are partitioned by a partition wall having a lowermost edge extending below a bottom rim of the body attachable to a filler neck of the vehicle's fuel system.

a fuel vapor flow passage extends between the inlet space and the outlet space, the body further comprising a normally open sealing member for sealing said passage upon introducing a filling muzzle into a filler neck of the vehicle's fuel system.

Other features disclosed in connection with the liquid vapor separator in this specification, apply to the vehicle's fuel system as well.

BRIEF DESCRIPTION OF THE DRAWINGS

In order to understand the invention and to see how it may be carried out in practice, some embodiments will now be described, by way of non-limiting examples only, with reference to the accompanying drawings, in which:

FIGS. 12A to 12C are schematic illustrations of a liquid vapor separator according to the present invention mounted on a filler neck of a fuel system, each comprising a roll over valve;

DETAILED DESCRIPTION OF EXEMPLARY EMBODIMENTS

Figure 1:
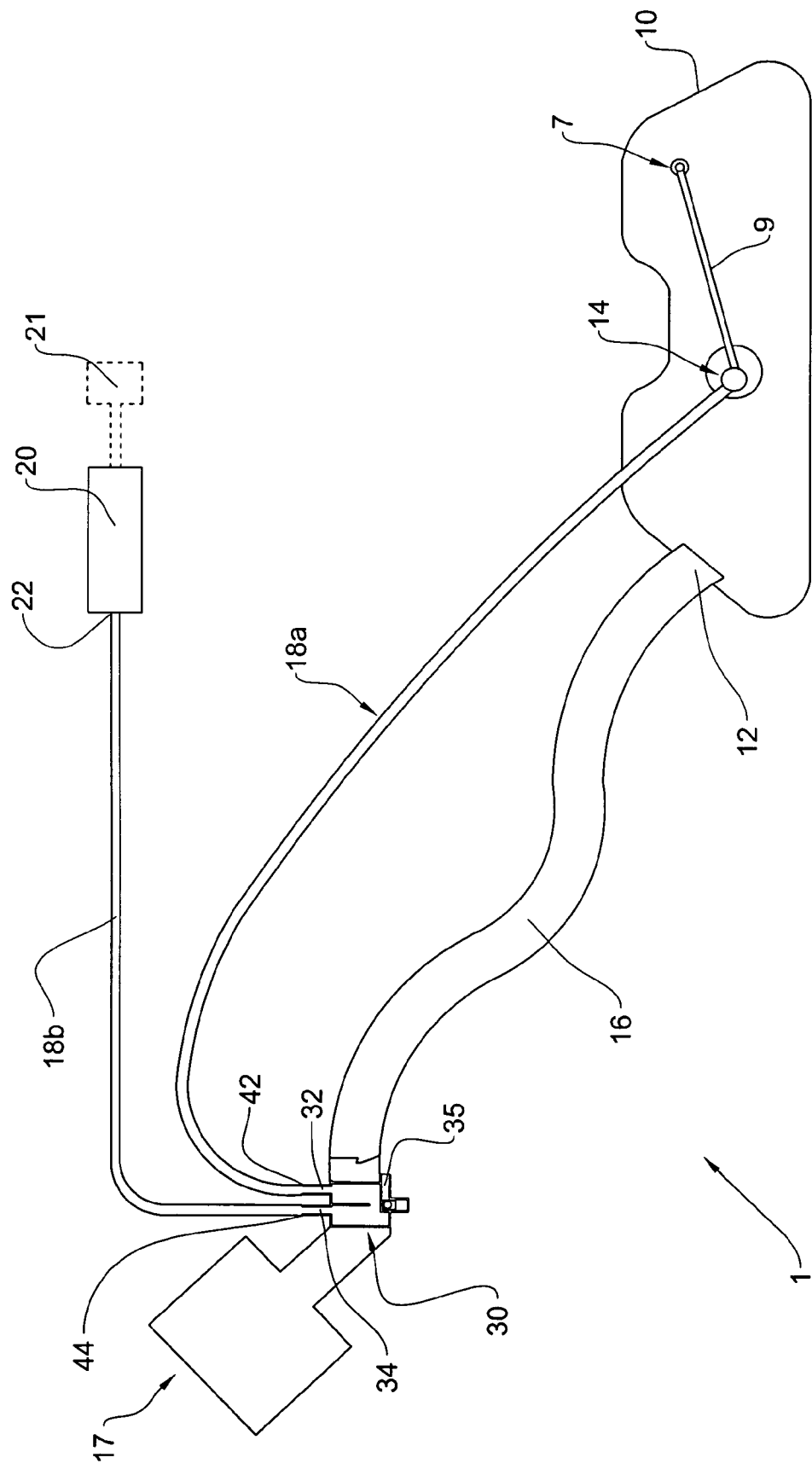
FIG. 1 is a schematic illustration of a vehicle's fuel system fitted with a liquid vapor separator according to the present invention.
Figure 4:
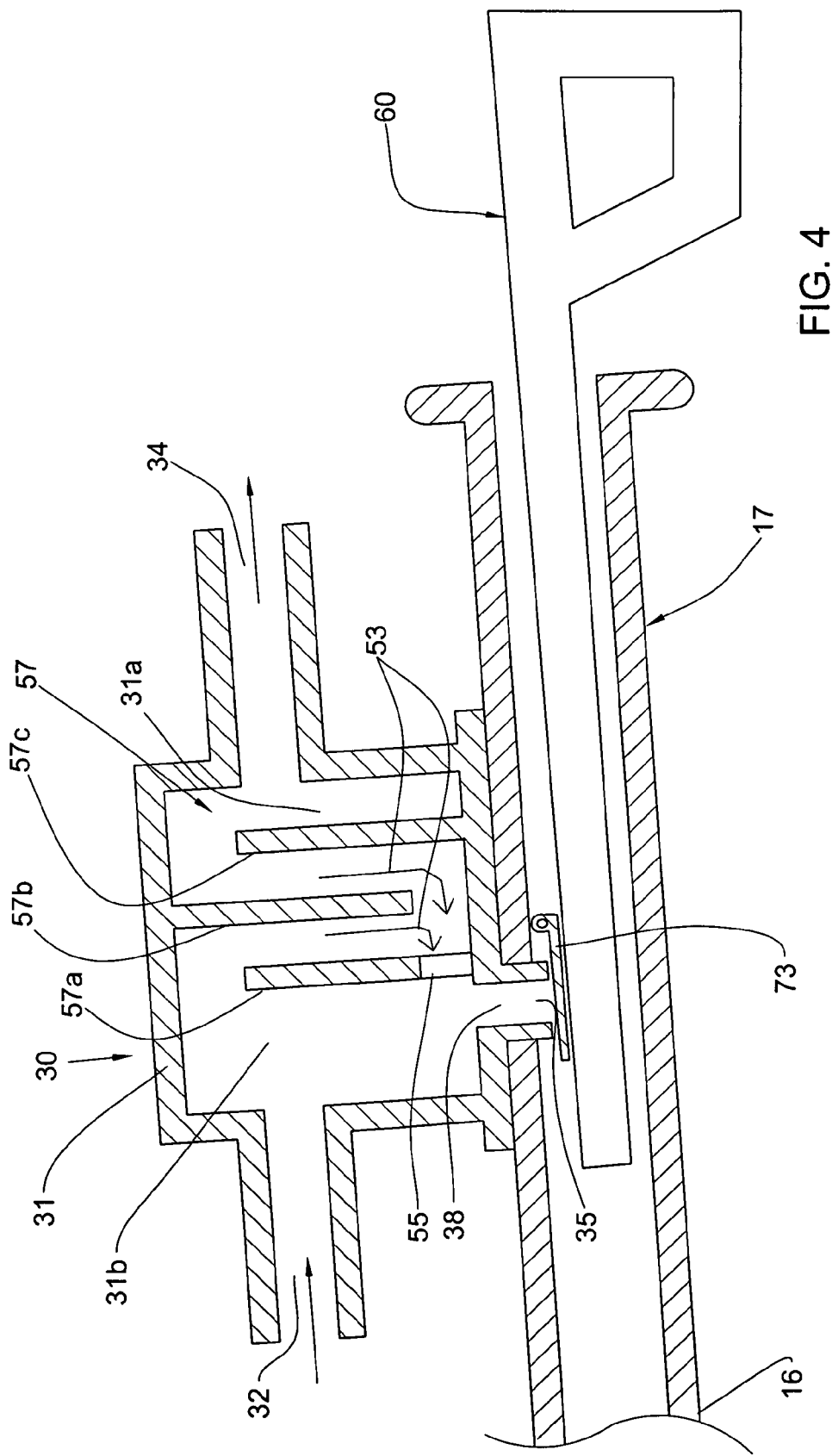
FIG. 4 is a schematic representation of the liquid vapor separator according to the present invention, attached to a filler neck of an automobile, with a the fuel nozzle inserted into the filler neck during refueling.

Referring first to FIG. 1 of the drawings, there is illustrated a schematic illustration of a vehicle's fuel system generally designated 1, fitted with a liquid vapor separator (LVS) according to the present invention generally designated 30. The fuel system shown comprises a fuel tank 10 fitted with a fuel inlet 12 for fuel ingress and a fuel outlet 14 for fuel egress, which is in turn coupled to a valve 7 (e.g. roll over valve) by tubing 9. The fuel inlet 12 is connected to a fuel inlet line 16 (fuel filler neck) fitted with a filler head 17 at its top, for receiving a refueling muzzle 60 (FIG. 4). The fuel outlet 14 is connected to a fuel vapor filter (canister) 20 via a vapor line 18 fitted with liquid vapor separator 30 dividing the vapor line into a first portion 18a and a second portion 18b.

Figure 2:
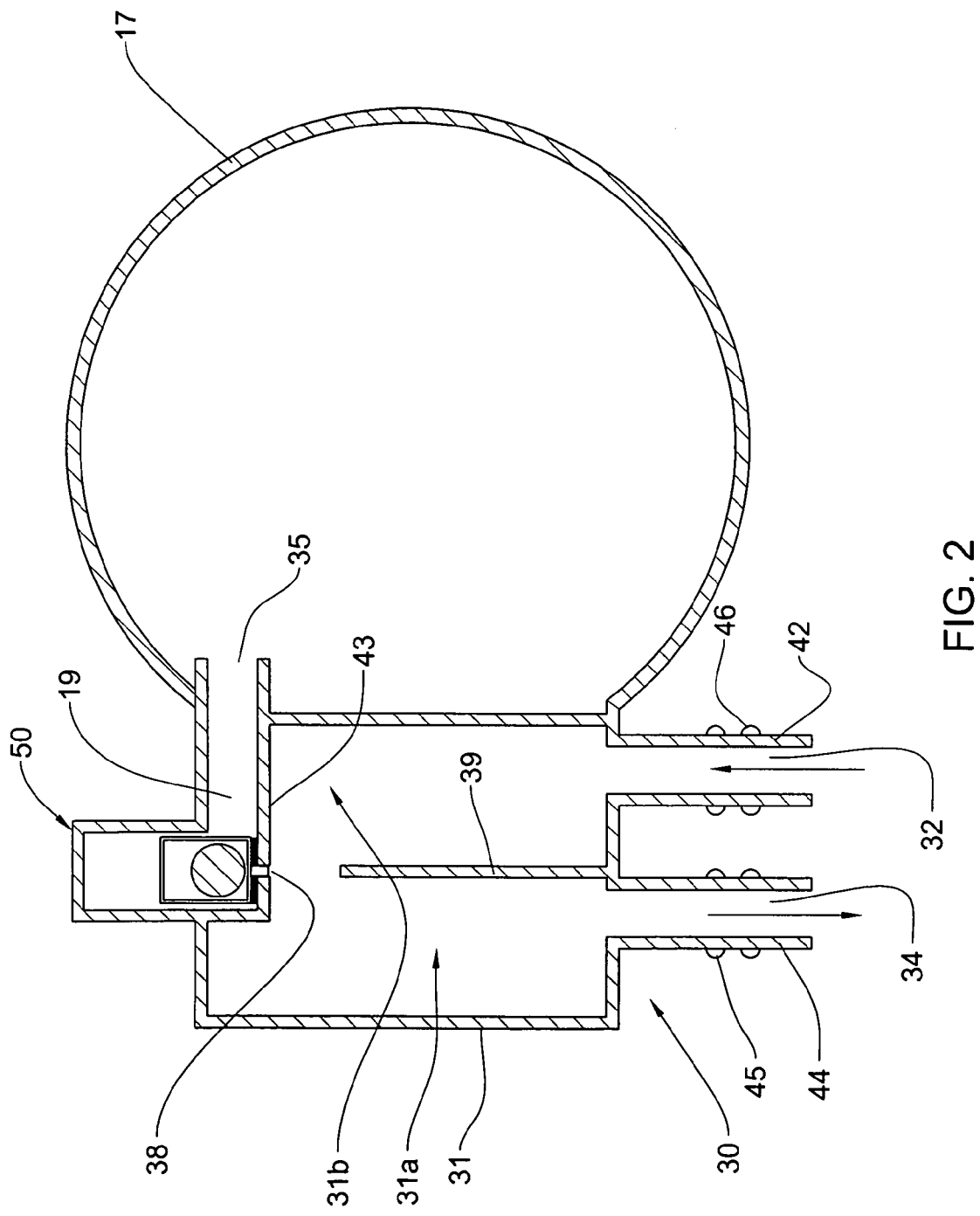
FIG. 2 is a is a schematic representation of the liquid vapor separator according to the present invention, attached to a filler neck of an automobile, at an operative mode.

More particularly and with further reference to FIG. 2, the first portion 18a connects the fuel outlet 14 of the fuel tank 10 with an inlet 32 of the liquid vapor separator 30, and the second portion 18b connects an outlet 34 of the liquid vapor separator 30 to an inlet 22 of the fuel vapor filter 20.

The liquid vapor separator 30 has a draining port 35 being in fluid communication with the filler head 17, via a communicating fuel drainage path 19. The liquid vapor separator 30 is adapted to allow fuel vapor coming in from the fuel tank 10 to pass into the fuel vapor filter 20, while diverting fuel droplets, along flow path 33 back through the filler neck 16 and into the fuel tank 10.

The liquid vapor separator 30 is attached to the filler head 17 of the filler neck 16 at a level such that it is engaged with the refueling nozzle 60 upon refueling (FIG. 4). The liquid vapor separator 30 has a body 31 formed according to one embodiment as two hollow cylinders, giving rise to a outlet space 31a and an inlet space 31b. The inlet space 31b is in flow communication with the inlet 32 via an inlet tube segment 42 coupled to the fuel tank by tube section 18a and the outlet space 31a is in flow communication with the outlet 34 via inlet tube segment 44 coupled to the canister 20 by tube section 18b (FIG. 1).

Figure 3:
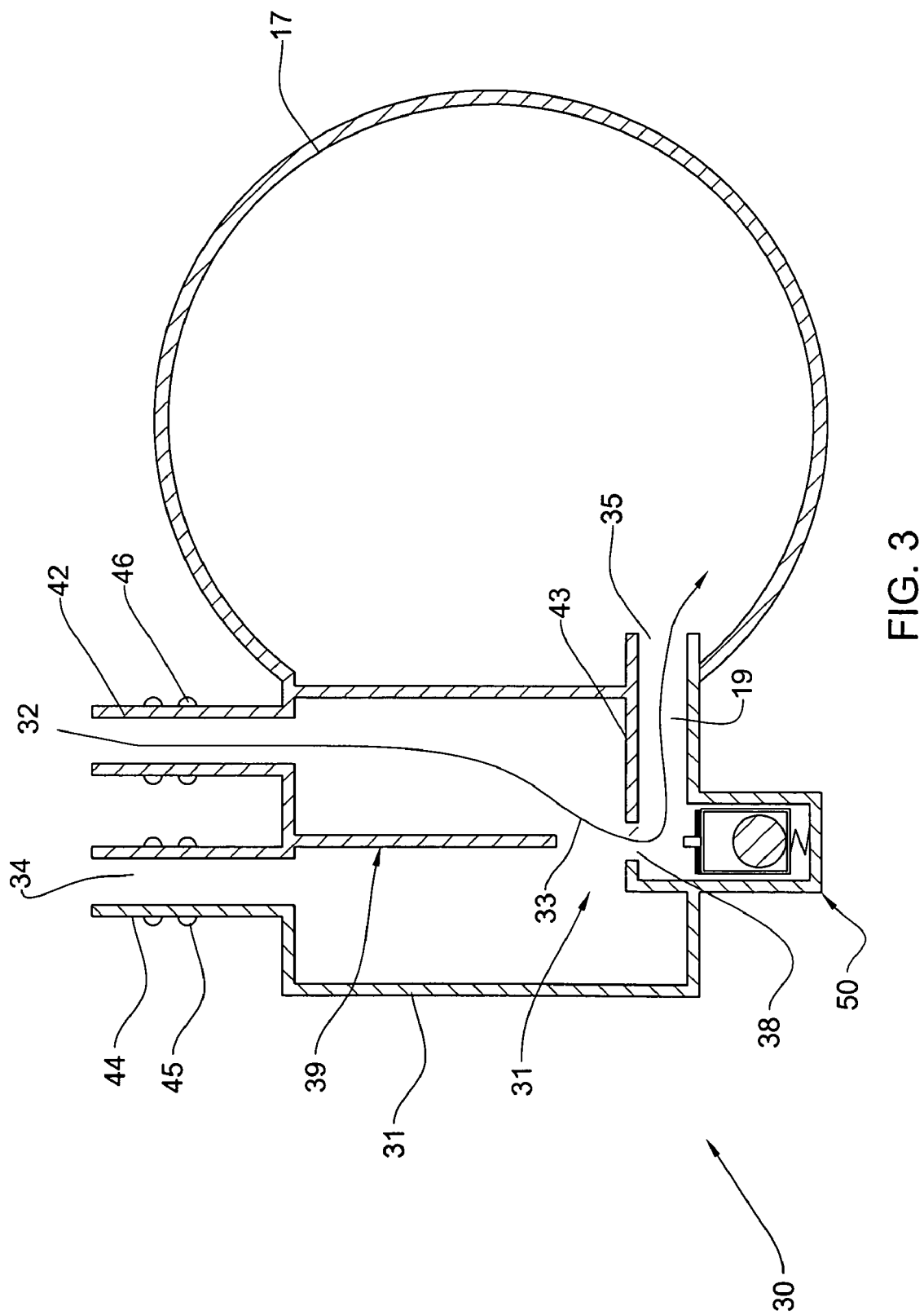
FIG. 3 is a schematic representation of the liquid vapor separator according to the present invention, attached to a filler neck of an automobile, at a roll-over position.

Both the outlet tube section 44 and the inlet tube section 42 are fitted with circumferential ribs 45 and 46, respectively to prevent spontaneous disengagement of the respective pipeline (not shown in FIGS. 2 and 3) connected thereto.

The inlet space 31b is closed at its bottom by a bottom cover plate 43, said plate being formed with a draining outlet 38 which is in flow communication with the draining port 35 via fuel drainage path 19.

The inlet space 31b and outlet space 31a are partitioned from one another by a separating wall 39, which according to some embodiments is a curved wall. The surface of the separating wall 39 is so designed that any fuel droplets trapped and formed thereon will drip down along its surface, and flow towards the drain opening 38. The separating wall 39 also provides a condensation surface on which fuel vapor may condense as will be explained in detail later.

As illustrated in the embodiment of FIG. 4, the liquid vapor separator 30 is fitted with a modified partition between the inlet space and the outlet space, said separating wall being in the form of a maze generally designated 57 comprising several partitioning walls 57a, 57b and 57c. The arrangement is such that fuel vapor flow in direction from the inlet space 31b towards the outlet space 31a is obstructed by the maze walls 57a, 57b and 57c, whereby droplets encounter these walls and drain downwards in the direction of arrows 53 through aperture 55 and out through drain opening 38.

It is however appreciated that more or less partition walls may be applied and that their shape and surface quality may change so as to increase their overall surface area, thereby increasing the effective surface contact area with the fluid flow and thus trapping substantially all the liquid droplets.

In addition, according to the exemplary embodiment shown, the liquid vapor separator 30 is fitted with a roll over valve (ROV) generally designated 50, as known per se and as disclosed hereinafter for example, in connection with other embodiments. It should be noted, that the drain outlet 38 may also be coupled to an on-board diagnostic system (OBD) e.g. positioned in series with the fuel vapor filter 20 such as element 21 represented in FIG. 1 by dashed lines. The OBD 21 acts to generate a pressure (positive or negative) resulting in corresponding pressure/vacuum residing at the filler head 17 through drain port 35.

In operation, during normal operation of the fuel system 1, fuel vapor mixed with fuel droplets is drawn through fuel outlet 14 (and venting valves when provided; not shown) and through the first line portion 18*a* towards the fuel vapor filter 20. The mixed vapor enters the hollow body 31 of the liquid vapor separator 30, through the inlet 32. In order to reach the outlet 34, fuel vapor is forced to pass between the inlet space 31*b* and the outlet space 31*a*, over the partitioning wall 39 or maze 57, and then only it can flow towards the outlet 34.

During this flow, fuel droplets which are heavier than vapor, drop down over the wall 39 or maze walls 57 and drain towards the drain outlet 38. From the drain outlet 38, the fuel droplets flow towards the outlet 34 and from there into the filler head 17 and back into the fuel tank 10 via filler neck 16.

In addition, due to the subtractive increase in volume between the vapor line 18 and the hollow body 31, some of the fuel vapor may condense, on the separating wall 39 or maze walls 57, and turn into fuel droplets, draining towards the drain outlet 38 as explained before.

Thus, the hollow body 31 of the liquid vapor separator 30, due to its unique construction, operates as a liquid trap for the mixed vapor flowing in from the fuel tank, and prevents fuel droplets from reaching the fuel vapor filter 20.

Furthermore, according to the embodiment of FIG. 4, the fuel system is fitted with a flapper door 73 as known in the art, said door being normally closed, namely closing a flow path between the filler neck 16 and the filler head 17. However, when fuel is pumped into the fuel tank, a nozzle 60 of a fuel gun is inserted into the filler head 17, which nozzle 60 displaces the flapper door 73 in to its open position, resulting in restricting the effective section area of the draining port 35 by partially blocking it, during refueling, thereby decreasing fluid flow circulation and in turn decreasing fluid flow towards the fuel vapor filter 20.

In addition, during refueling, giving rise to pressure difference created between the filler neck 17, the fuel tank 10 and the vapor line 18, causing the mixed vapor to be more saturated with fuel droplets. The liquid vapor separator 30 forces the fuel droplets to drop back into the filler neck 17 as previously explained, and thus facilitates fuel recirculation.

Figure 5:
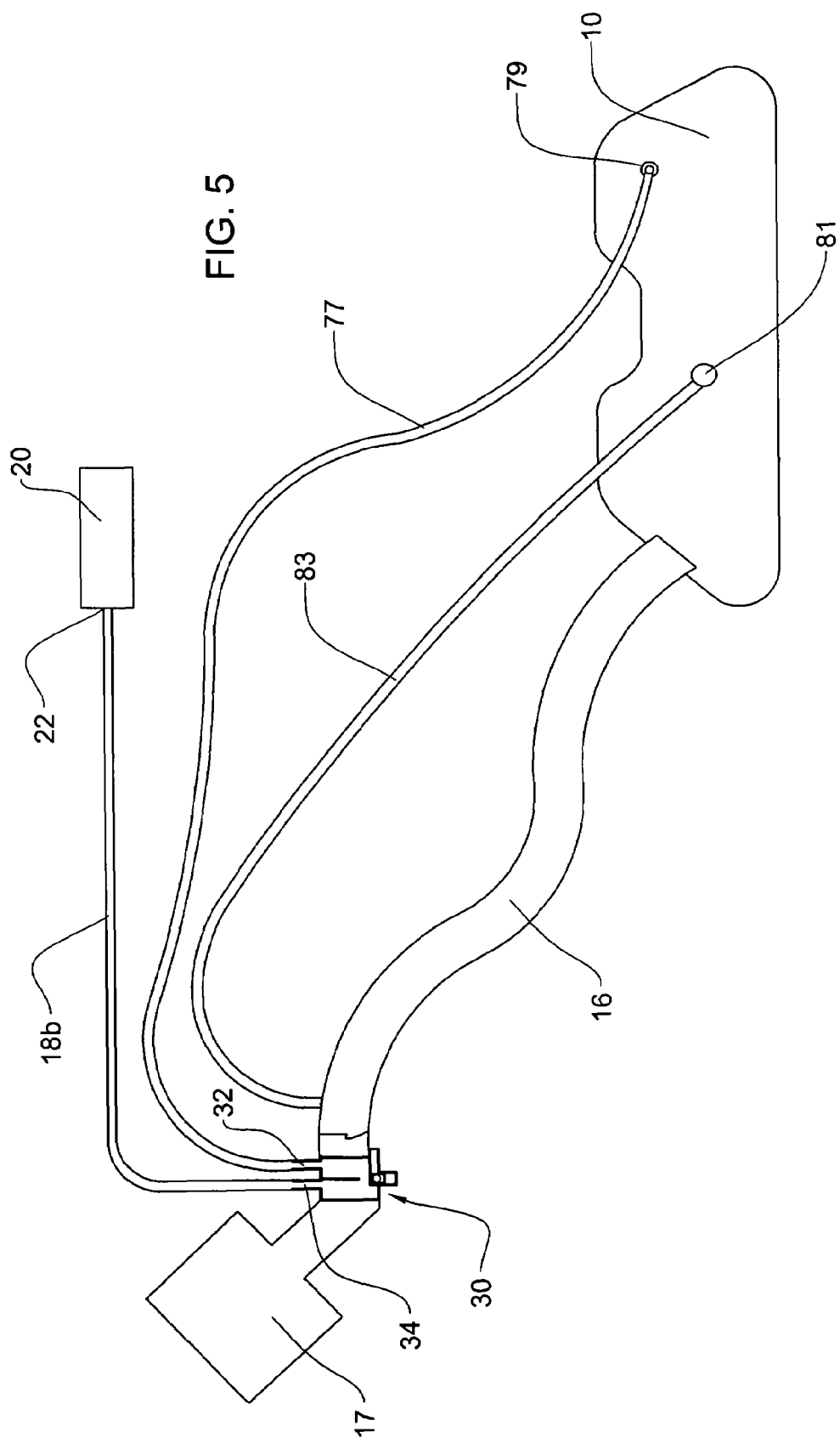
FIG. 5 is a schematic illustration of a vehicle's fuel system according to a modification thereof, fitted with a liquid vapor separator according to the present invention.

In the embodiment of FIG. 5 there is a schematic representation of a modification of a fuel system according to the invention. The embodiment of FIG. 1 represents a fuel system of a vehicle fitted with an on board refueling recovery system (referred to as an ORVR system), wherein the vehicle's fuel vapor filter handles the fuel vapor also during refueling the vehicle. However, the embodiment of FIG. 5 illustrates a vehicles fuel system useful in locations wherein a refueling station is fitted with a fuel vapor handling system, i.e. the refueling nozzle is fitted with a suction system for carrying fuel vapor to a central fuel vapor filter (canister) of the gas station, etc.

The liquid vapor separator 30 according to the invention is fitted at the filler head 17 of the filler neck of fuel tank 10, however wherein the inlet 32 of the liquid vapor separator 30 is coupled via tubing 77 to a valve system e.g. roll over valve (ROV) 79. The fuel outlet 34 is coupled via second portion 18*b* to an inlet 22 of the fuel vapor filter 20 and a filling limit valve 81 is coupled to an upper portion of the filler neck 16 via pipe 83.

Figure 6:
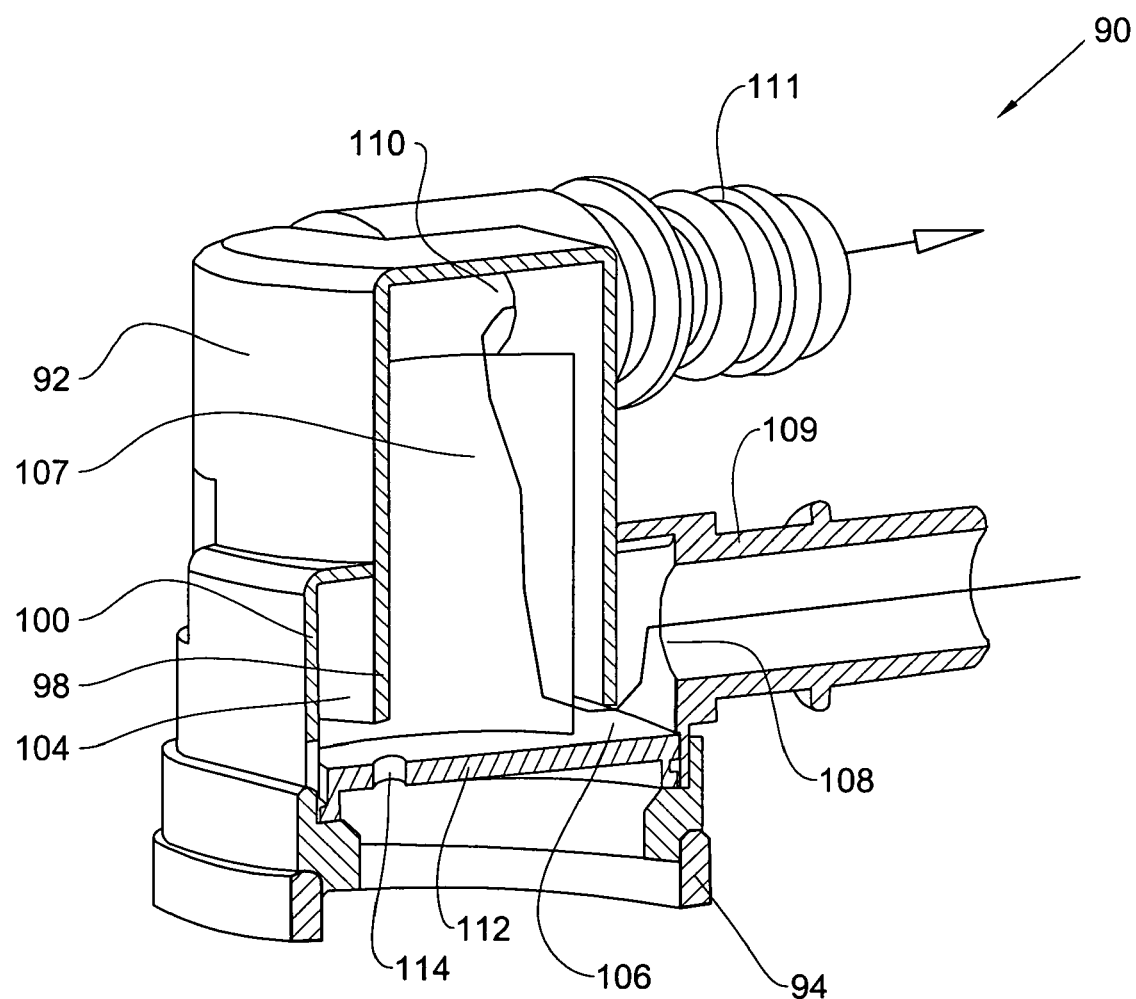
FIG. 6 is a partially sectioned isometric illustration of a liquid vapor separator according to an embodiment of the invention.

Turning now to FIG. 6 of the drawings there is illustrated a liquid vapor separator 90 according to an embodiment of the invention, wherein the housing 92 is substantial cylindrical and comprises a sealing ring 94 for attaching to the filler head (not shown) in a sealingly tight manner. The housing 92 is fitted with an inner wall 98 which together with an outer wall 100 give rise to an annular path 104 (referred to in the previous embodiments as an inlet space), with a drain path 106 extending between the annular path 104 and the central space 107 (referred to in the previous embodiments as an outlet space). The housing is further fitted with an inlet 108 (fitted with an inlet tube segment 109) extending into said path 104, and an outlet 110 (fitted with an outlet tube segment 111) extending from a central space 107 of the housing at a substantially top portion thereof. A plate 112 is formed at the bottom base of the hosing and is formed with a drain port 114 extending substantially opposite to said inlet 108.

In operation, mixed vapor enters the annular path 104 of the liquid vapor separator 90, through the inlet 108. In order to reach the outlet 110, fuel vapor is forced to pass between the inlet space 104 and the outlet space 107, over the inner wall 98 (referred to in the previous embodiments as a partition wall), and then only it can flow towards the outlet 110.

During this flow, fuel droplets which are heavier than vapor, drop down over the wall 98 and drain towards the outlet 114, and from there into to the filler head and back into the fuel tank via filler neck.

In addition, due to the subtractive increase in volume between the inlet 108 and the outlet space 107, some of the fuel vapor may condense, on the separating wall 98, and turn into fuel droplets, draining towards the outlet 114 as explained before.

Figure 7:
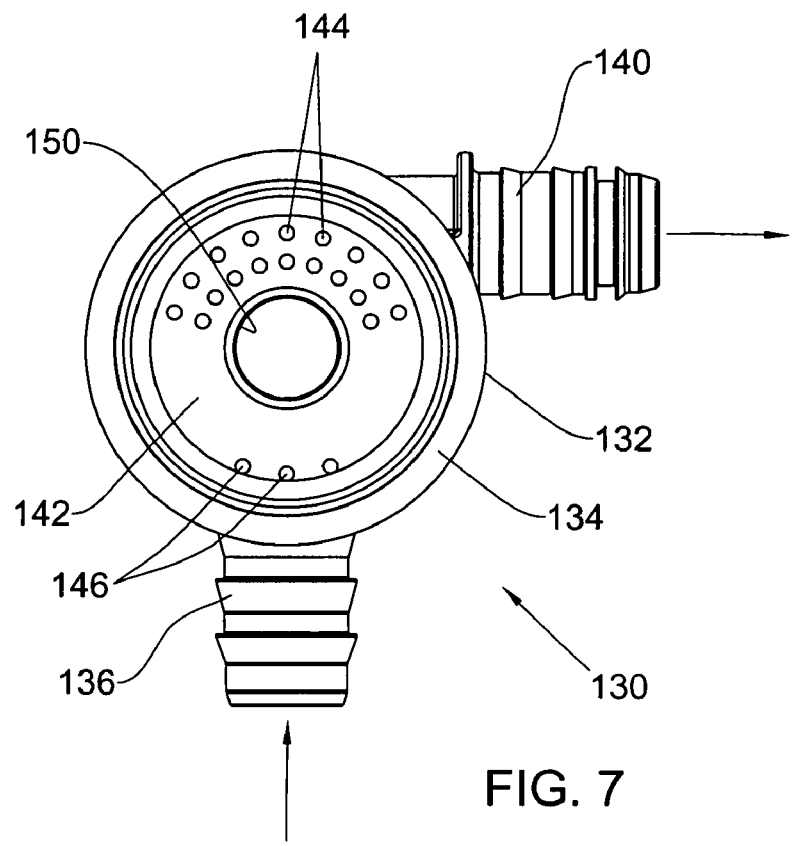
FIG. 7 is a front view of a liquid vapor separator according to an embodiment of the present invention.
Figure 8A:
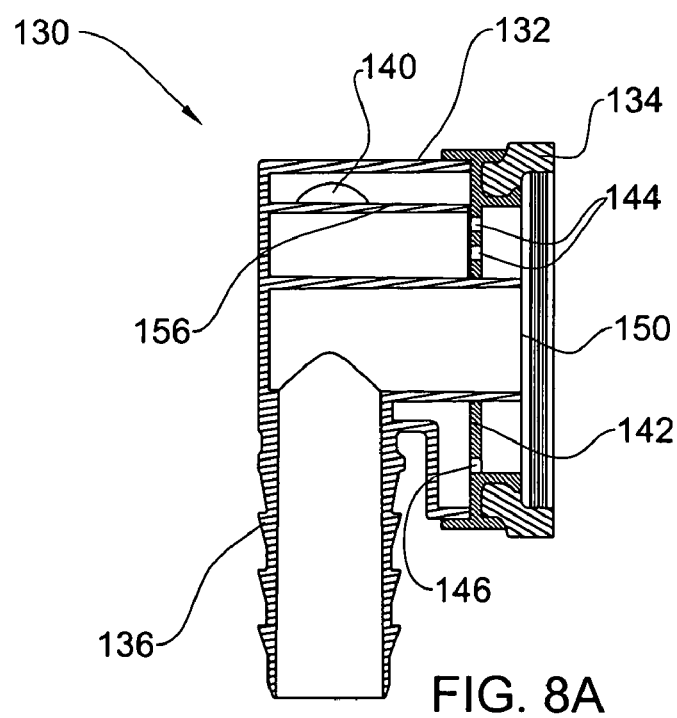
FIG. 8A is a sectioned side view of the liquid vapor separator of FIG. 7.
Figure 8B:
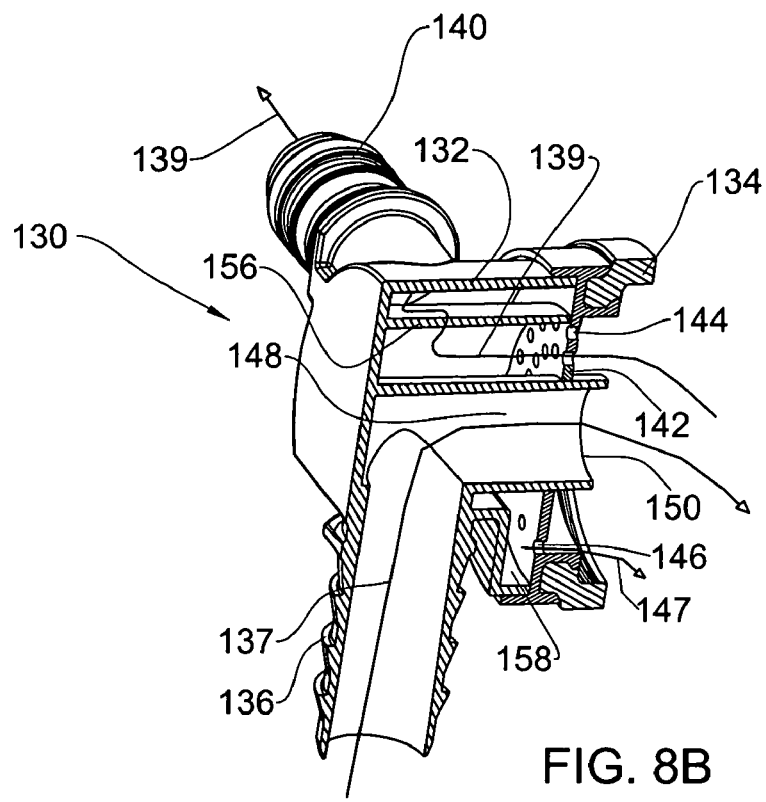
FIG. 8B is a sectioned isometric view of the liquid vapor separator of FIG. 7, illustrating fluid flow lines.

Turning now to FIG. 7 of the drawings, there is illustrated a liquid vapor separator in accordance with an embodiment of the present invention generally designated 130 comprising a generally cylindrical housing 132 (FIGS. 8*a* and 8*b*) formed with a front face 134 adapted for securing to an upper end of a fuel filler neck (not shown) in a vapor impermeable manner e.g., by, but/hot welding, fusion welding etc. The housing 132 is fitted with an inlet port 136 which is connectable to the fuel system venting system (e.g., fuel vapor venting valve, etc.). An outlet port 140 extends from the housing 132 towards a fuel vapor filter (canister) not shown.

Figure 8C:
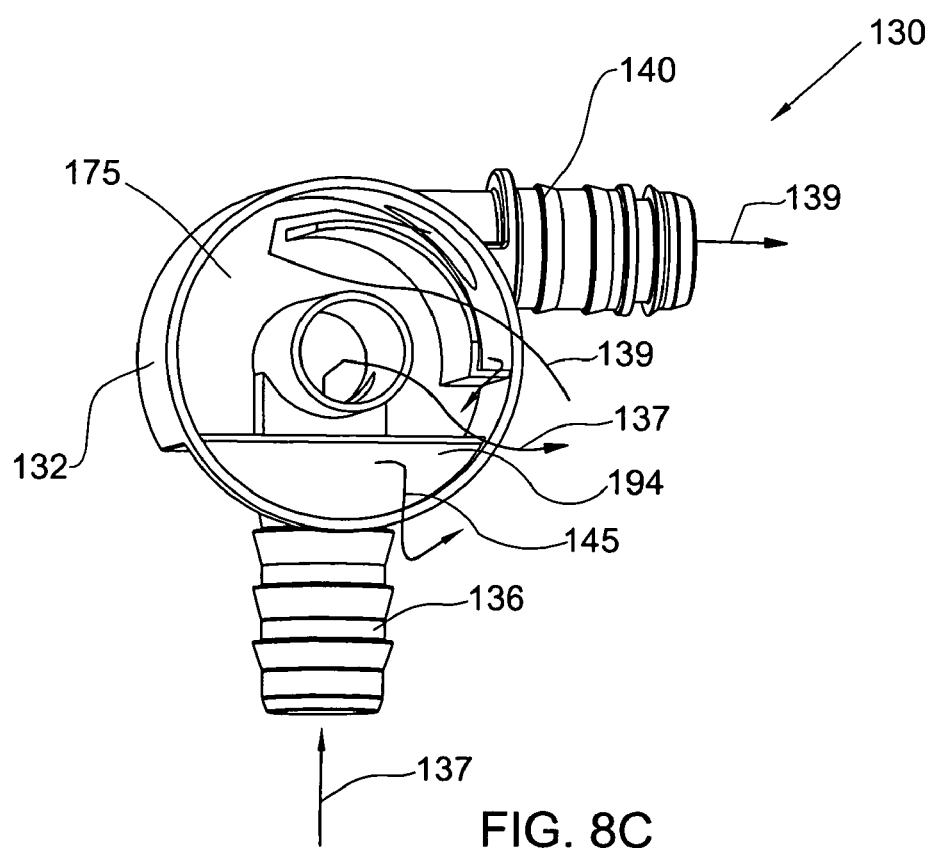
FIG. 8C is a front view of FIG. 8C, with a front wall of the liquid vapor separator removed for visualization.

As can further be noted, a front portion of the housing is fitted with a front wall 142 (removed for clarification in FIG. 8*c*) said wall 142 fitted with a plurality of first apertures 144 extending at an upper portion thereof, and several apertures 146 extending at a lower portion thereof, as will be explained hereinafter. Furthermore, the inlet port 136 extends via an L-shaped duct 148 and terminates at an opening 150 (which at the assembled position extends right into the filler neck pipe).

The liquid vapor separator 130 in accordance with this embodiment is thus formed with a fluid inlet path wherein a mixture of fuel liquid droplets and fuel vapor flows along flow path 137 (FIGS. 8B and 8C) from the venting system (not shown) into inlet port 136 and through the opening 150 into the expansion chamber formed by the vast expansion created at the filler neck pipe (not shown). Upon rapid expansion of the mixture flowing through the inlet path 137, there occurs a significant drop in pressure whereby fuel vapor now entering the device 130 through inlet apertures 144 of the front plate 142 and fuel vapor generated during fuel fill-up (which is the time at which most fuel vapor is generated) flows along outlet path 139 (FIGS. 8b and 8C) through the labyrinth walls 156 towards the outlet 140 in the form of vapor only. Any liquid which has entered the housing through inlet apertures 144 condensates on the labyrinth walls 156 and will flow downwards towards the collecting well 158 whereby accumulated fuel liquid will then drain through outlet apertures 146 along drain path 147 (FIGS. 8b and 8C) back into the filler neck of fluid system (not shown).

It is appreciated that a liquid vapor separator 130 as of the type illustrated in FIGS. 7 and 8 is suitable in particular, though not restricted to, for use with vehicle fuel systems wherein a majority of fuel vapor generating during a refueling system is treated by a refueling muzzle (not shown) fitted for suction of the fuel vapors created during refueling and treated by a central fuel vapor treating center. However, it is appreciated that fuel vapors generated during vehicle operation (while driving or standing), and any residual fuel vapor not suctioned by a refueling muzzle, are directed via outlet port 140 to a fuel vapor treating system (canister).

Figure 9:
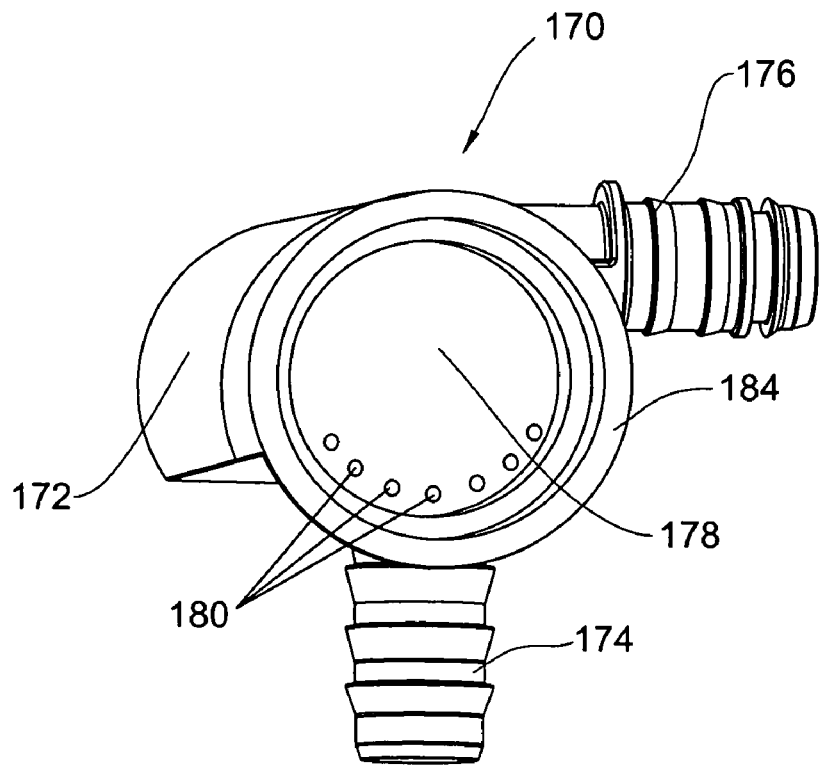
FIG. 9 is an isometric front view of a liquid vapor separator according to still an embodiment of the present invention.

Turning now to the embodiment of FIG. 9, there is illustrated a liquid vapor separator in accordance with an embodiment of the invention generally designated 170 which similar to the previous embodiment comprises a cylindrical housing 172, an inlet port 174 connectable to a venting system (e.g. liquid fuel venting valve) and an outlet port 176 which in turn is connectable to a vapor treating system (canister not shown). The liquid vapor separator 170 is formed with a front wall 178 which in turn is formed at its lowermost part with a plurality of apertures 180. The front face of the device 170 is fitted with a room 184 for tight connection to a filler neck of a fuel system e.g. by fusion welding, etc., however in a gas and liquid impermeable manner.

Figure 10A:
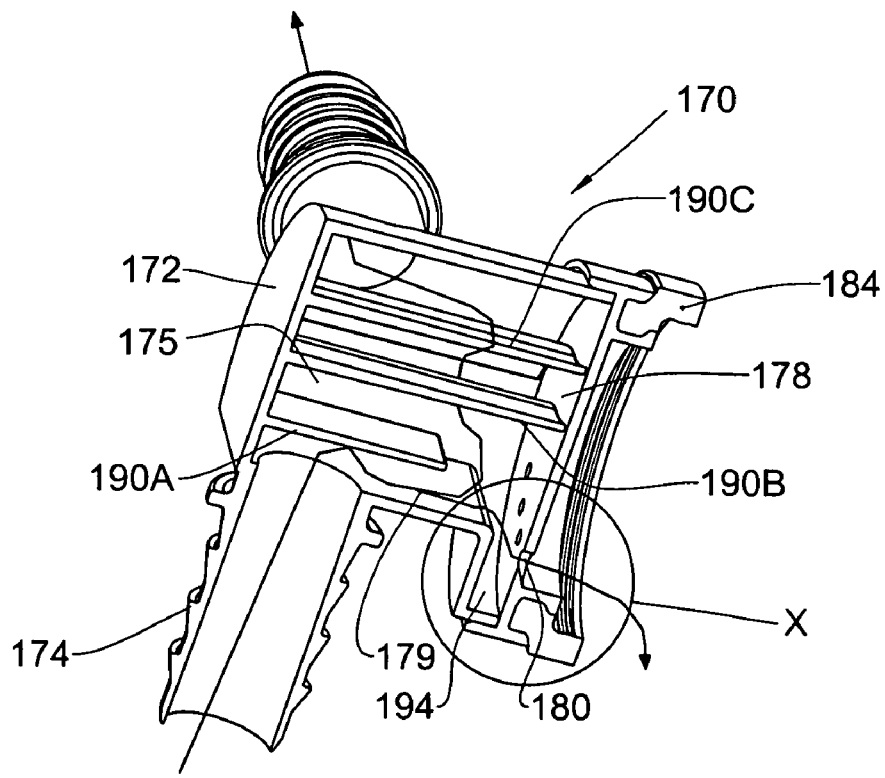
FIG. 10A is a sectioned isometric view of the liquid vapor separator of FIG. 10, illustrating fluid flow lines.
Figure 11:
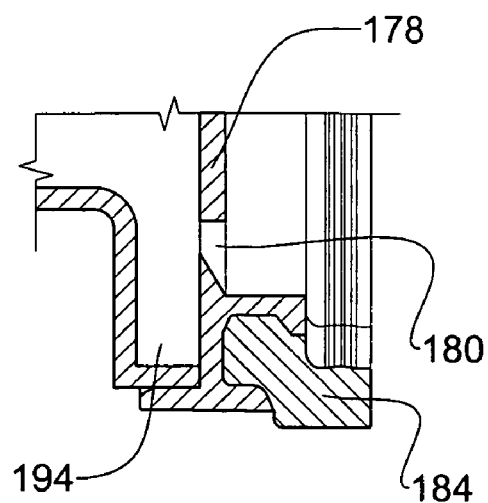
FIG. 11 is an enlargement of the portion marked X in FIG. 10.
Figure 10B:
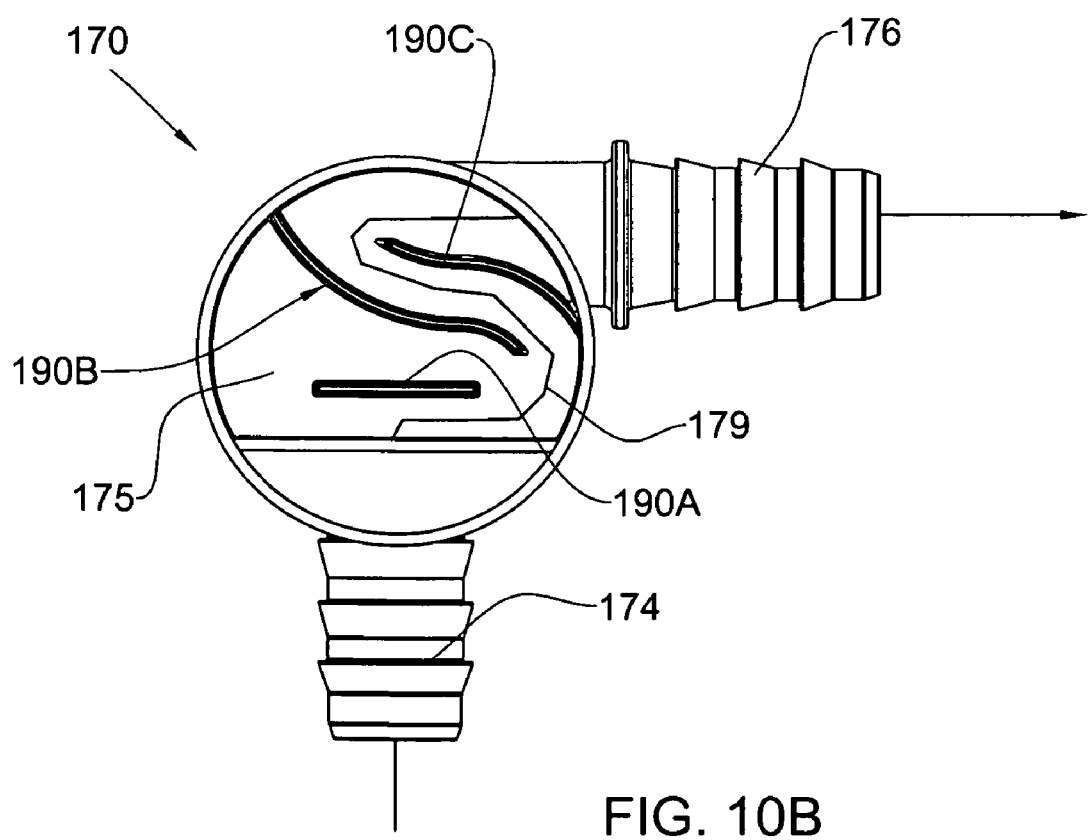
FIG. 10B is a front view of the liquid vapor separator of FIG. 8C, with a front wall of the liquid vapor separator removed for visualization, illustrating fluid flow lines.

The liquid vapor separator 170 in accordance with this embodiment is designed in a manner such that a mixture of fuel droplets and fuel vapor flowing in through the inlet port 174 enters into the large inlet space 175 of housing 172, said space constituting an expansion chamber fitted with a maze (labyrinth) constituted by several walls 190A, 190B, 190C, wherein fluids flows through the inlet port 174 and along path 179 towards the outlet 176 is delayed by said wall barriers, resulting in condensation of liquid droplets on said walls. The shape of the walls 190A to 190C is wavy to thereby ensure that liquid drops generated on these walls will drop downwards and will accumulate at the well portion 194 (FIGS. 10A and 11) and eventually, said fuel liquid will drain through the outlet apertures 180 back to the fuel tank via the filler neck (not shown).

With further reference to FIGS. 12A and 12B there is a schematic illustration of a portion of a fuel filler neck generally designated 200 fitted with a liquid vapor separator in accordance with any of the above embodiments of the present invention and generally designated 224, said liquid vapor separator fitted in turn with a liquid inlet port 226 and an outlet port 228.

Both the embodiments of FIGS. 12A and 12B are common in that they comprise a roll-over valve generally designated 230 (embodiment of FIG. 12A) and 232 (embodiment of FIG. 12B) the purpose of which being to prevent fuel liquid from entering the liquid vapor separator 30 at the event of vehicle rollover which would otherwise result in fuel flow towards the fuel vapor treating filter (canister) via outlet port 228.

The embodiments of FIGS. 12A and 12B differ from one another in the construction of the rollover valve 230 and 232 respectively, wherein the embodiment of FIG. 12A comprises a fair 240 received within a cage 242 said cage having a plurality of apertures 244 allowing liquid flow and an aperture 248 extending between the rollover valve 230 and the liquid vapor separator 224 whereby the normal cause of operation the fair 240 is disengaged from the aperture 248 allowing liquid flow between the aperture 248 and the apertures 244 of the cage 242. However, at the event of rollover, the fair 240 engages the aperture 248 under influence of gravity forces acting on it there, thus sealingly closing the aperture 248 preventing liquid flow into the liquid vapor separator 224.

The device of FIG. 12B is similar to the device of the previous embodiment, however, with the difference that the fair 250 is received within a sealing capsule 252 which in turn is displaceable within cage 254 and is also fitted with a sealing membrane 256 for effective sealing of the aperture 258 at the event of rollover of the vehicle.

The embodiment of FIG. 12C illustrates how a rollover valve mechanism generally designated at 270 is fitted in conjunction with a liquid vapor separator 272 mounted adjacent a filling neck of a filler bite 274. Whilst the construction of the liquid vapor separator 272 may assume any of the embodiments disclosed herein the specification, this particular design illustrates how a rollover valve mechanism 270 is fitted on a tube segment 278 extending between a vapor outlet 280 of the liquid vapor separator 272 and before a fuel vapor treating device (canister) 282.

The rollover valve mechanism 270 comprises a housing 286 accommodating a float member 288 which in turn accommodates a spheric element 290. Housing 270 comprises an inlet 290 extending from the tube segment 278 and an outlet port 296 extending towards the canister.

The arrangement is such that at normal operation, when the vehicle is at its standing or driving position, fuel vapor from the liquid vapor separator 270 flows through outlet 280, via tube segment 278 and via the rollover vent 270 through outlet 296 and into the canister 282. However, at the event of rollover of the vehicle the outlet 296 becomes sealed in light of the sphere 290 displacing the float 288 into sealing engagement over outlet 296, thus preventing egress of any liquid fuel towards the canister 282.

Turning now to the embodiment illustrated in FIGS. 13A to 13D illustrates a particular design of a liquid vapor separator generally designated and being of the type typically suited for use at those countries where during refueling fuel vapor is treated in particularly, though not solely, by a central solution (e.g. by the gas station as vapor is withdrawn through the refueling muzzle), this being contrary to the embodiments wherein fuel vapor generated during refueling is treated mainly by the vehicle's fuel vapor treating device (canister).

The liquid vapor separator 300 is in the form of a housing 302 fitted with a flange 304 for securely typing to a filler neck (not shown) of the vehicle's fuel system at a vapor impermeable manner, as already discussed hereinabove. The housing 302 further comprises an inlet port 306 and an outlet port 308. The inlet port 306 is designed for coupling to the venting system of the fuel tank (not shown) for receiving therethrough fuel vapor and fuel liquid, typically in the form of droplets, flowing therein. The outlet 308 is designed for coupling to a vapor treating device (e.g. a canister not shown).

Figure 13A:
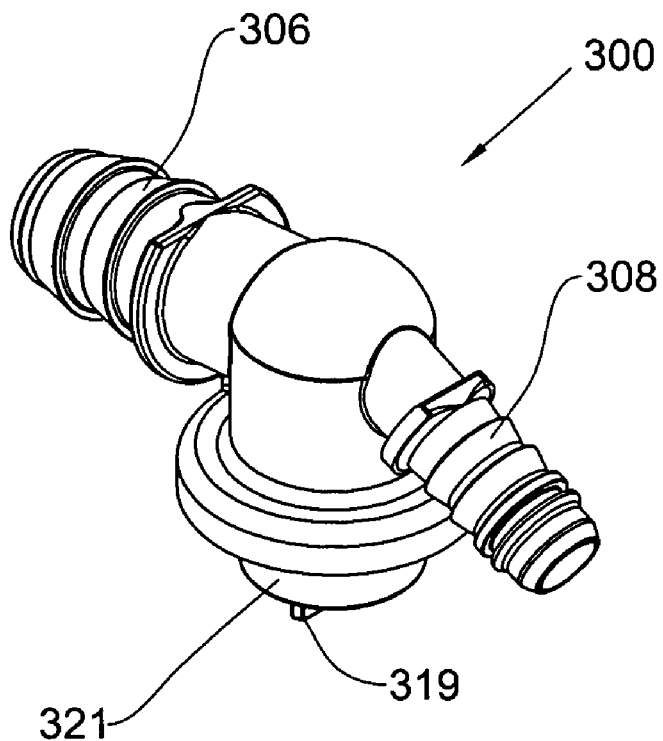
FIGS. 13A to 13C illustrate a liquid vapor separator valve in accordance with a particular design of the present invention.
Figure 13B:
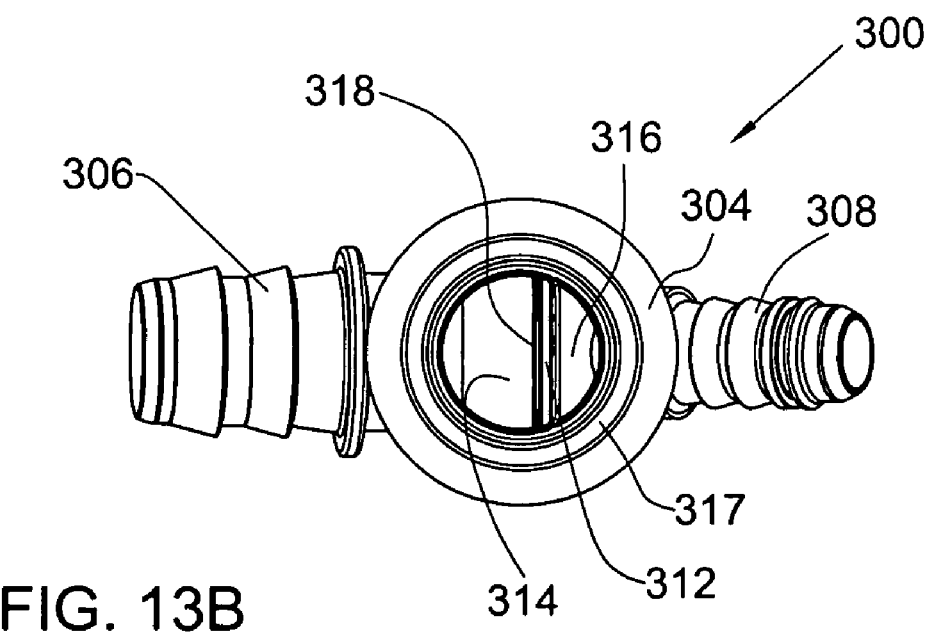
Figure 13C:
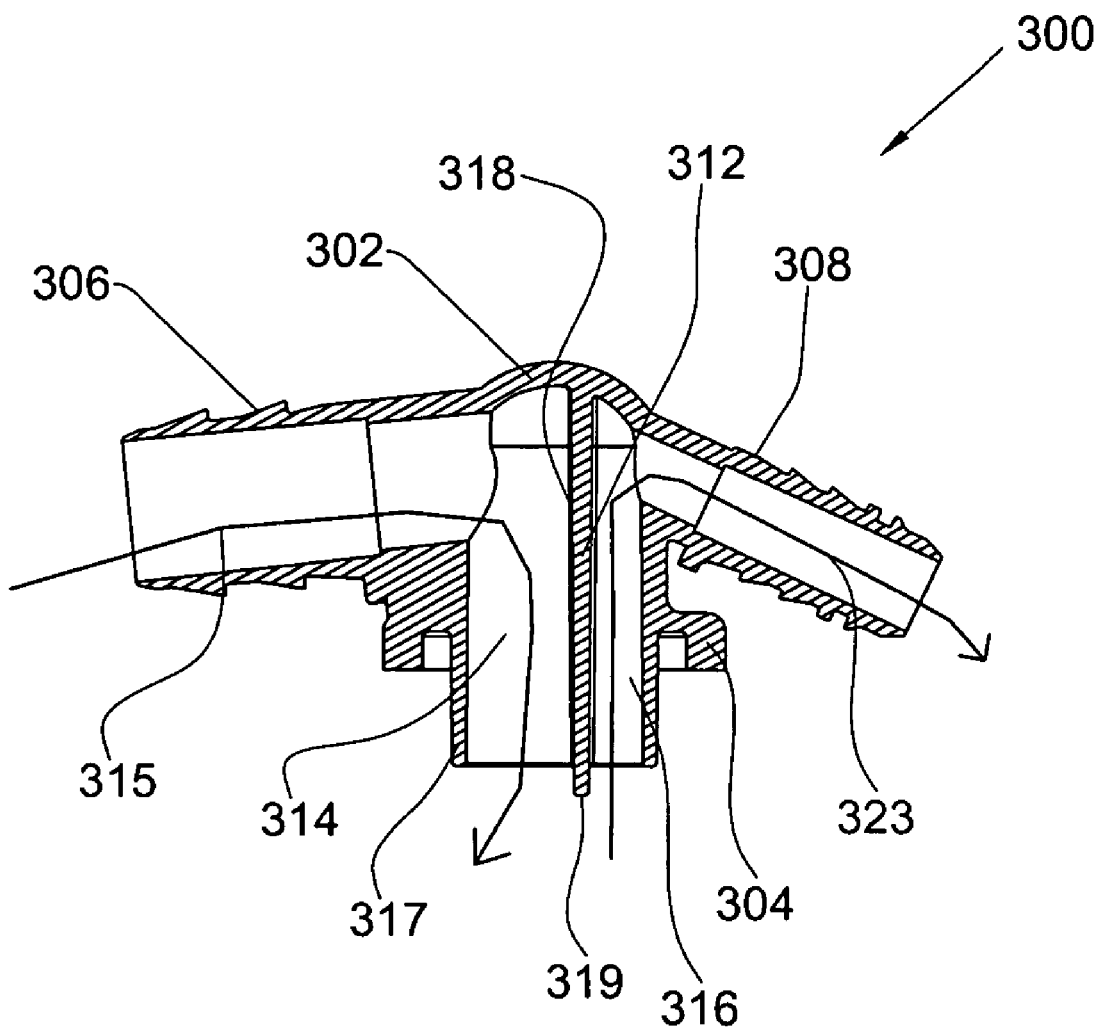

As can be seen, best in FIGS. 13B and 13C, the housing 302 is formed with a partition wall 312 dividing the internal space of the housing into an inlet space 314 and an outlet space 316, the latter being significantly smaller than the former.

The arrangement is such that the liquid and vapor mixture entering the inlet space 314 from the vehicle's fuel system flows into the significantly larger space of the filler neck (not shown) along the in-flow path as designated by arrowed line 315 designating the in direction flow, whereby the pressure differential results in fuel droplets to generate on the inside surface 318 of the partition wall 312 and then drip into the filler neck whereby fuel vapor alone will then flow through the outlet space 316 towards the canister, along the flow path indicated by arrowed line 323. It is also noted that bottom end 319 of partition wall 312 extends below the bottom edge 317 of the housing 321 extending into the filler neck (not shown).

It is well appreciated that the pressure within the filler neck is lower than that residing within the fuel tank, owing to the valve fitted at a lower part of the filler pipe, adjacent the fuel tank, preventing pressure generation within the filler neck and retaining the pressure within the fuel tank, at least during operation of the vehicle. The significant pressure differential between the filler neck and the liquid vapor separator results in separation of the liquid fuel droplets from the fuel vapor such that liquid fuel can return on the force of gravity towards the fuel tank whilst fuel vapor flows along the flow path 323 towards the canister.

Figure 14A:
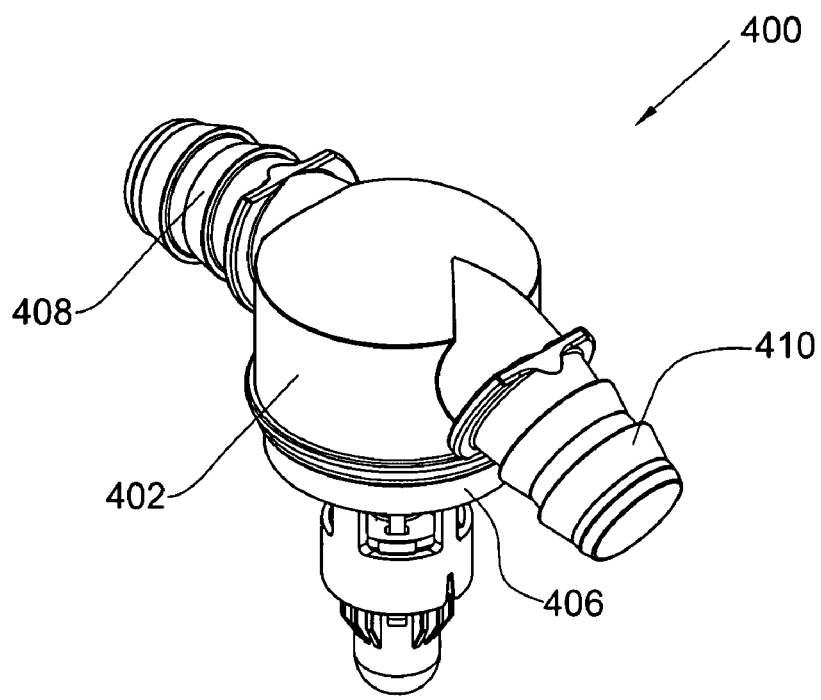
FIGS. 14A to 14D are respective views of a liquid vapor separator valve in accordance with yet another particular design of the present invention.

Turning now to the embodiments disclosed in FIGS. 14A to 14C there is illustrated a liquid vapor separator in accordance with a further design of the present invention generally designated 400 comprising a housing 402 formed with an annular fitting 406 for secure fitting to a filler neck of a vehicle's fuel system (not shown) in a manner which is vapor impermeable, as discussed hereinabove.

The housing 402 comprises an inlet port 408 for coupling to the fuel tank valve in the system (not shown) and an outlet port 410 for coupling to a fuel vapor treating device (e.g. canister not shown).

Received within the housing 400 there is a switch valve generally designated 411 which as will be discussed hereinafter in further detail, is normally biased by a spring element 412 into its normally open position as in the embodiment of FIG. 14C.

Further noticed, within the housing there is a partition wall 416 dividing the internal space of the liquid vapor separator into an inlet space 418 and an outlet space 420.

The switch valve 411 comprises a plunger 422 which in turn is biased by means of spring 424 against a sealing plate 426. It is noticed that the switch valve 411 namely sealing element 426 and plunger 422 are axially displaceable within an axially extending support sleeve 430 integrated with the housing 402. The plunger 422 well projects into the filler neck such that upon introducing a filling muzzle into the filler neck, it engages said plunger, resulting in its depression as will be explained herein after.

A liquid inlet path extends between the inlet port 408, through the inlet space 418 and out through apertures 432 formed in the support sleeve, said inlet flow path being illustrated by arrowed line 438 illustrating the flow path of the liquid—vapor fuel mixture which may then flow back towards the fuel tank (not shown). On the other hand, and as discussed hereinbefore, fuel vapor only, may flow back through the apertures 432, via passage 423 into the outlet space 420 and then through the outlet port 410 towards the canister (not shown).

Figure 14B:
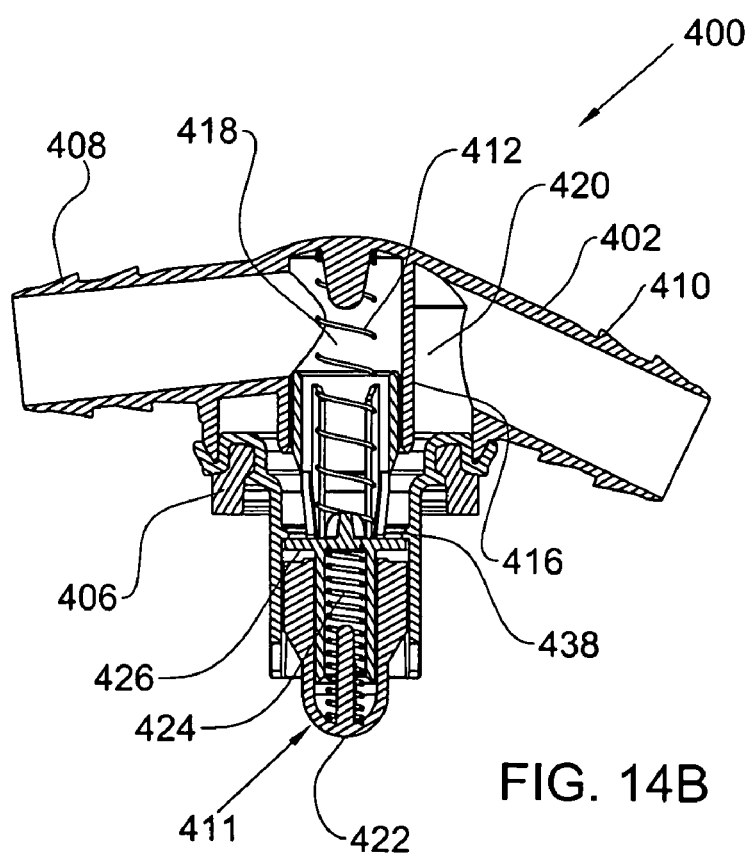
Figure 14C:
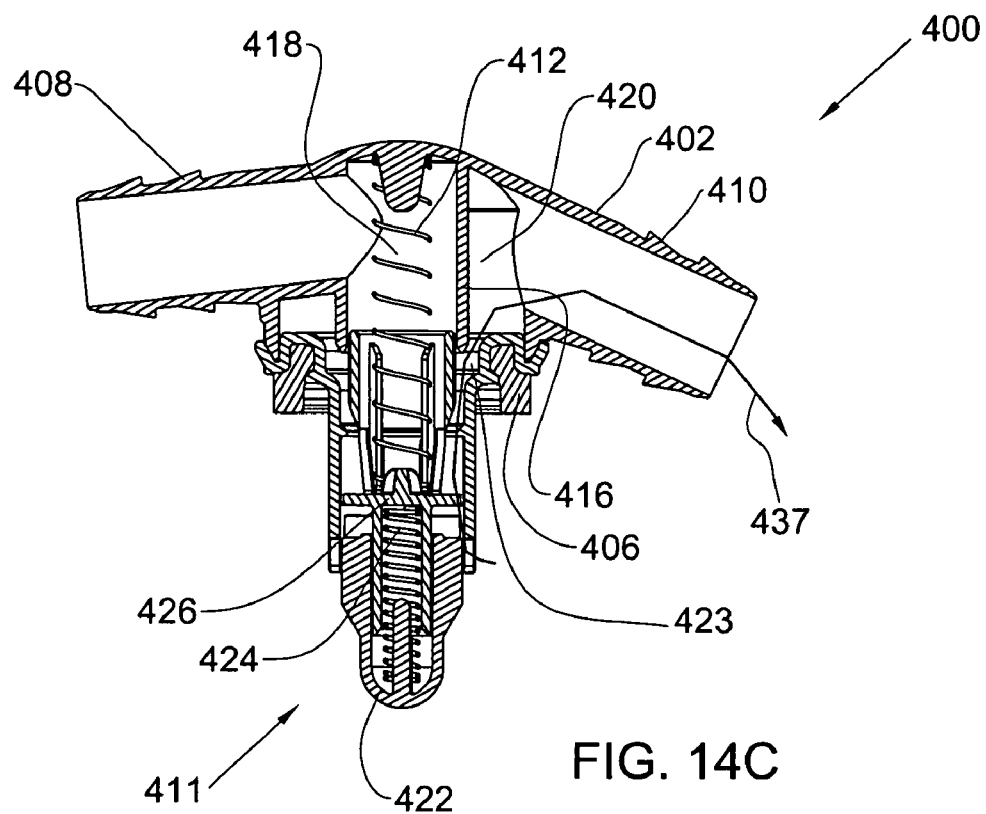
Figure 14D:
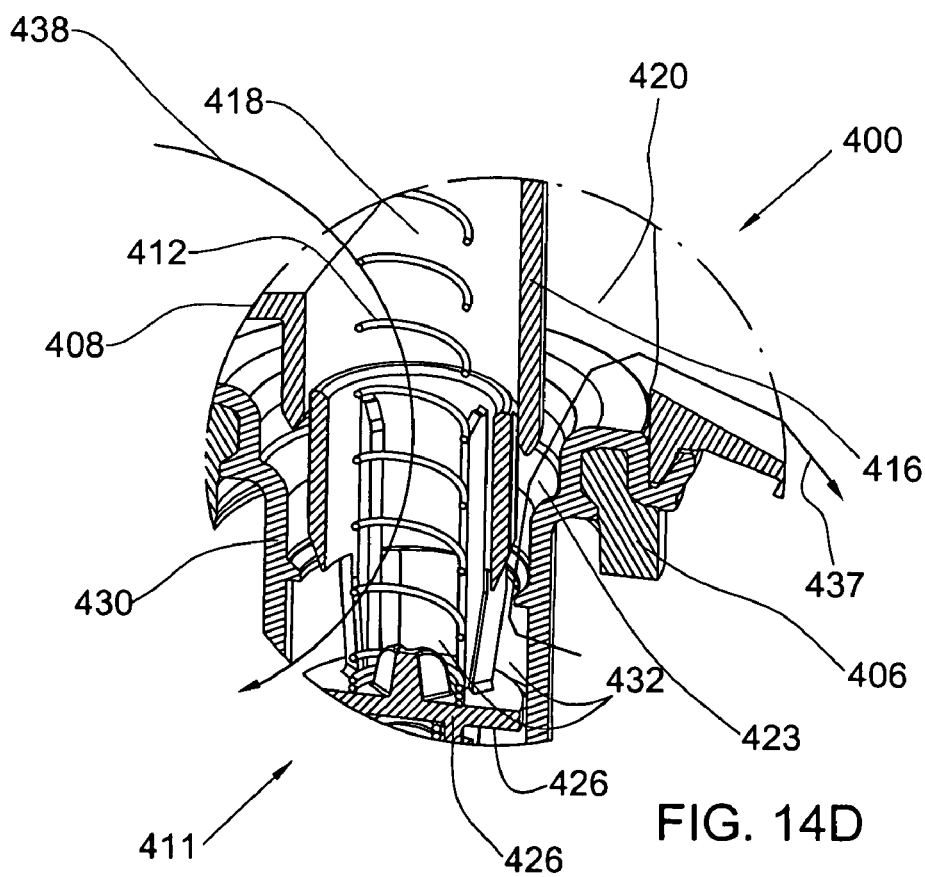

However, upon refueling, whilst introducing the fueling muzzle (not shown) the muzzle will encounter plunger 422, resulting in its axial displacement against the biasing effect of a coiled spring 424 and 412 to thereby displace the sealing plate 426 such that it sealingly rests against an annular support 438, to thereby prevent flow in the direction towards the outlet along the flow path designated by arrowed lines 437, as illustrated in FIG. 14B.

Those skilled in the art to which this invention pertains will readily appreciate that numerous changes, variations, and modifications can be made without departing from the scope of the invention, mutatis mutandis.

The invention claimed is:

1. A liquid vapor separator for a vehicle's fuel system, said liquid vapor separator comprising a body having a fuel vapor inlet extending into an inlet space, a fuel vapor outlet extending from an outlet space, a droplet separator comprising at least one partition wall for separating fuel droplets from the fuel vapor and directing said droplets to a draining port connectable to the vehicle's fuel tank, and a fuel vapor flow path extending between the fuel vapor inlet and the fuel vapor outlet, wherein the flow path passes through the inlet space and the outlet space, and wherein the at least one partition wall extends between the inlet space and the outlet space serving as a gas expansion space.

2. The liquid vapor separator according to claim 1, wherein the droplet separator is a maze comprising at least two interlacing walls such that fuel flow is forced between said walls, wherein fuel droplets are captured by the maze walls and drip towards the draining port extending into the filler neck.

3. The liquid vapor separator according to claim 2, wherein the droplet separator is a labyrinth flow path comprising a condensation surface for said fuel vapor.

4. The liquid vapor separator according to claim 1, wherein the fuel vapor inlet is adapted for coupling to an outlet of a venting system of the fuel system, and the fuel vapor outlet is adapted for coupling to a fuel vapor filter of the fuel system.

5. The liquid vapor separator according to claim 1, wherein the fuel vapor inlet is located below the fuel vapor outlet and above the draining port, whereby fuel vapor is directed to flow upwards to egress through said outlet, while fuel droplets within fuel vapor drop down towards the draining port.

6. The liquid vapor separator according to claim 5, wherein the draining port extends into a fuel filler neck of the fuel system.

7. The liquid vapor separator according to claim 1, wherein the fuel vapor inlet extends into a fuel filler neck of the fuel system serving as an expansion space, and wherein the fuel vapor outlet is in flow communication with the fuel filler neck.

8. The liquid vapor separator according to claim 7, wherein a wall of the liquid vapor separator attached to the fuel filler neck is formed with at least one inlet aperture formed at an upper portion thereof, and with at least one outlet aperture formed at a bottom portion thereof, said at least one inlet aperture being in flow communication with the fuel vapor outlet and said at least one outlet aperture being in flow communication with the fuel vapor inlet, said at least one inlet aperture and at least one outlet aperture extending to the filler neck of the fuel system.

9. The liquid vapor separator according to claim 1, wherein the fuel vapor inlet is in flow communication with the fuel vapor outlet via an expansion space of the body, said space comprising the draining port extending into a fuel filler neck of the fuel system.

10. The liquid vapor separator according to claim 1, wherein the inlet is exposed to pressure residing within the fuel tank and the liquid separator is exposed to pressure residing at a filler neck of the fuel system, whereby pressure differential between over the liquid vapor separator results in separation of liquid fuel droplets from fuel vapor such that liquid fuel can return by force of gravity towards the fuel tank whilst fuel vapor is treated separately.

11. The liquid vapor separator according to claim 1, wherein the inlet space and the outlet space are partitioned by a partition wall having a lowermost edge extending below a bottom rim of the body attachable to a filler neck of the vehicle's fuel system.

12. The liquid vapor separator according to claim 1, wherein a fuel vapor flow passage extends between the inlet space and the outlet space, the body further comprising a normally open sealing member for sealing said passage upon introducing a filling muzzle into a filler neck of the vehicle's fuel system.

13. A vehicle's fuel system comprising a fuel vapor filter, a fuel tank fitted with a filler neck having a filler head, and a liquid vapor separator, said liquid vapor separator comprising a body having a fuel vapor inlet extending into an inlet space, a fuel vapor outlet extending from an outlet space, and a droplet separator comprising at least one partition wall for separating fuel droplets from the fuel vapor and directing said droplets to a draining port connectable to the vehicle's fuel tank via said filler head.

14. A liquid vapor separator for a vehicle's fuel system, the liquid vapor separator comprising a body having an inlet connectable with a venting system of a fuel tank and a vapor outlet connectable to a fuel vapor treating device, and a condensation space for condensation of fuel droplets, the condensation space being in flow communication with said inlet and with said outlet, and the condensation space extending at or being in flow communication with a filler neck of the fuel system,
wherein the inlet extends into an inlet space and the vapor outlet extends from an outlet space,
wherein the condensation space comprises a droplet separator comprising at least one partition wall for separating fuel droplets from the fuel vapor and directing said droplets via a draining port to the vehicle's fuel tank via the filler neck, whilst fuel vapor is free to flow out through said fuel vapor outlet.

15. The fuel system according to claim 13, wherein the fuel vapor inlet is located below the fuel vapor outlet and above the draining port, whereby fuel vapor is directed to flow upwards to egress through said outlet, while droplets within fuel vapor drop down towards the draining port, whereby the liquid vapor separator may further be adapted to drain said droplets back to the draining port and from there to the filler head.

16. The fuel system according to claim 15, wherein the droplet separator is a maze comprising at least two interlacing walls such that fuel flow is forced between said walls, wherein fuel droplets are captured by the maze walls and drip towards the draining port.

17. The fuel system according to claim 16, wherein fuel drainage is of such a configuration that condensed or entrained fuel runs off into the filler neck substantially under the effect of the force of gravity.

18. The fuel system according to claim 13, wherein the droplet separator is a maze comprising at least two interlacing walls such that fuel flow is forced between said walls, wherein fuel droplets are arrested by the maze walls and drip towards the draining port.

19. The fuel system according to claim 13, wherein the fuel vapor outlet is coupled to a fuel vapor filter.

20. The fuel system according to claim 19, wherein an on board diagnostic system is coupled to the fuel vapor outlet.

21. The fuel system according to claim 13, wherein the filler head is fitted with a flapper door displaceable between a normally closed position and an open position, wherein at said open position said flapper door partially interferes with the draining port to thereby reduce its effective area.

22. The fuel system according to claim 13, wherein the draining port is positioned at a level above a tip of a fuel gun nozzle inserted into the filler head whereby flooding of the liquid vapor separator through said draining port is prevented.

23. The fuel system according to claim 16, wherein the maze comprises several interlacing walls wherein fuel flow is forced between said walls such that droplets are arrested by the maze walls and then drip towards the draining port.

24. The fuel system according to claim 13, wherein the inlet of the liquid vapor separator is located below the outlet and above the draining port, whereby fuel vapor should flow upwards in order to reach the said outlet, while droplets within fuel vapor drop down towards the draining port, wherein fuel vapors flow up to the outlet to reach the fuel vapor filter and fuel droplets drop down or drip along said one or more separating wall, accumulate in bottom of the liquid vapor separator and drain into the draining port and from there back to the filler head while the pressure in the filler neck is below or equal the pressure in the liquid vapor separator.

25. The fuel system according to claim 13, wherein the draining port extends into the fuel filler neck of the fuel system.

26. The fuel system according to claim 13, wherein the fuel vapor inlet extends into the fuel filler neck of the fuel system serving as an expansion space, and wherein the fuel vapor outlet is in flow communication with the fuel filler neck.

27. The fuel system according to claim 16, wherein a wall of the liquid vapor separator attached to a fuel filler neck of the vehicles fuel system is formed with at least one inlet aperture formed at an upper portion thereof, and with at least one outlet aperture formed at a bottom portion thereof, said at least one inlet aperture being in flow communication with the fuel vapor outlet and said at least one outlet aperture being in flow communication with the fuel vapor inlet, said at least one inlet aperture and at least one outlet aperture extending to the filler neck of the fuel system.

28. The fuel system according to claim 13, wherein the fuel vapor inlet is in flow communication with the fuel vapor outlet via an expansion space of the body, said space comprising the draining port extending into a fuel filler neck of the fuel system.

29. The fuel system according to claim 13, wherein the inlet is exposed to pressure residing within the fuel tank and the liquid separator is exposed to pressure residing at the filler neck, whereby pressure differential between the liquid vapor separator results in separation of liquid fuel droplets from fuel vapor such that liquid fuel can return by force of gravity towards the fuel tank whilst fuel vapor is treated separately.

30. The fuel system according to claim 13, wherein the inlet space and the outlet space are partitioned by a partition wall having a lowermost edge extending below a bottom rim of the body attachable to a filler neck of the vehicle's fuel system.

31. The fuel system according to claim 13, wherein a fuel vapor flow passage extends between the inlet space and the outlet space, the body further comprising a normally open sealing member for sealing said passage upon introducing a filling muzzle into a filler neck of the vehicle's fuel system.

* * * * *